(12) United States Patent
Kim et al.

(10) Patent No.: US 7,951,492 B2
(45) Date of Patent: May 31, 2011

(54) SECONDARY BATTERY AND ELECTRODE PLATE THEREFOR

(75) Inventors: Jung Ho Kim, Youngin-si (KR); Youn Han Chang, Youngin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1015 days.

(21) Appl. No.: 11/261,411

(22) Filed: Oct. 27, 2005

(65) Prior Publication Data

US 2006/0127774 A1   Jun. 15, 2006

(30) Foreign Application Priority Data

Oct. 28, 2004   (KR) .................. 10-2004-0086903

(51) Int. Cl.
- *H01M 2/14* (2006.01)
- *H01M 2/26* (2006.01)
- *H01M 4/66* (2006.01)
- *H01M 2/18* (2006.01)
- *H01M 10/04* (2006.01)

(52) U.S. Cl. ........ 429/246; 429/211; 429/234; 429/137; 429/94; 429/128

(58) Field of Classification Search .................. 429/137, 429/246, 211, 234, 94, 128
See application file for complete search history.

(56) References Cited

U.S. PATENT DOCUMENTS

| | | | | |
|---|---|---|---|---|
| 4,743,520 A | * | 5/1988 | Rosansky .................. | 429/94 |
| 5,662,978 A | * | 9/1997 | Brown et al. ................ | 428/57 |
| 6,387,564 B1 | * | 5/2002 | Yamashita et al. ........... | 429/132 |
| 6,432,586 B1 | * | 8/2002 | Zhang ..................... | 429/251 |
| 2004/0202928 A1 | * | 10/2004 | Miyamoto et al. ........... | 429/137 |

FOREIGN PATENT DOCUMENTS

| | | |
|---|---|---|
| CN | 1497755 A | 5/2004 |
| JP | 7-220759 | 8/1995 |

OTHER PUBLICATIONS

"Solvay Advanced Polymers," Primef polyphenylene sulfide, Accessed May 12, 2009, http://www.solvayadvancedpolymers.com/products/bybrand/primef/0,,326-2-0,00.htm.*
Material Property Data, Heat Deflection Temperature Testing of Plastics. Accessed May 26, 2009, http://www.matweb.com/reference/deflection-temperature.aspx.*
Patent Abstracts of Japan, Publication No. 07-220759; Date of Publication: Aug. 18, 1995; in the name of Takeshi Koike et al.

* cited by examiner

*Primary Examiner* — Ula C Ruddock
*Assistant Examiner* — Amanda Barrow
(74) *Attorney, Agent, or Firm* — Christie, Parker & Hale, LLP

(57) ABSTRACT

A secondary battery includes a first electrode plate, a second electrode plate, a separator interposed therebetween, and at least one insulation member. The first electrode plate has a first electrode collector having at least one surface on which a first electrode active material is coated to form a coating portion, a first electrode uncoated portion formed on at least one end of the first electrode collector, and a first protrusion formed on at least one end of the electrode coating portion. The second electrode plate includes a similar second electrode collector, a second electrode coating portion, a second electrode uncoated portion, and a second protrusion. The separator insulates the first electrode plate from the second electrode plate. The at least one insulation member is formed on and covers the first protrusion, the second protrusion, or both such that an electrolyte is flowable through the at least one insulation member.

22 Claims, 4 Drawing Sheets

SECONDARY BATTERY AND ELECTRODE PLATE THEREFOR

CROSS REFERENCE TO RELATED APPLICATION

This application claims priority to and the benefit of Korean patent application No. 10-2004-0086903 filed in the Korean Intellectual Property Office on Oct. 28, 2004, the entire disclosure of which is incorporated herein by reference.

FIELD OF THE INVENTION

The present invention relates to a secondary battery and an electrode plate, and more particularly to a secondary battery having an insulation member installed on an electrode plate of the secondary battery in order to prevent a short circuit between electrodes.

BACKGROUND OF RELATED ART

Recently, electric/electronic appliances having compact sizes with light weight, such as cellular phones, notebook computers and camcorders, have been actively developed and produced. Such electric/electronic appliances are equipped with battery packs so that users can use the electric/electronic appliances in various places even if electric power sources are not separately provided for the electric/electronic appliances. A battery pack includes at least one battery capable of outputting an operational voltage at a predetermined level in order to operate the electric/electronic appliances for a predetermined period of time.

Secondary batteries, which are rechargeable batteries fabricated in small sizes with high capacity, are currently employed in the secondary battery packs due to their economical advantages. Secondary batteries are extensively used as power sources for portable electronic appliances, such as camcorders, portable computers, and portable phones. For instance, Ni-MH batteries, Li-ion batteries and Li-ion polymer batteries have been developed as power sources for the portable electronic appliances.

In particular, lithium secondary batteries have an operational voltage of more than 3.6V, which is three times higher than that of Ni—Cd batteries or Ni-MH batteries used as power sources for the portable electronic appliances. In addition, lithium ion secondary batteries have high energy density per unit weight, so lithium ion secondary batteries are extensively used in advanced electronic technology fields.

A Li-ion secondary battery includes a bear cell, which is fabricated by accommodating an electrode assembly including a positive electrode plate, a negative electrode plate and a separator in a can made from aluminum or an aluminum alloy together with an electrolyte and sealing the can with a cap assembly.

In a typical polymer secondary battery, in which an electrode plate or a separator is made from polymer, the separator acts as the electrolyte or is impregnated with an electrolyte component, so the electrolyte is not leaked or leakage of the electrolyte is significantly reduced. Thus, a pouch can be used instead of the can.

In a typical Li-ion secondary battery, an electrode plate is formed by coating slurry (also referred to as a material forming an electrode coating portion) including electrode active materials (lithium oxides for a positive electrode (cathode) and carbon materials for a negative electrode (anode)) onto an electrode collector made from metal foil.

The slurry can be formed by mixing a solvent with a plasticizer, an electrode active material and a binder. In addition, a negative electrode collector is mainly made from copper and a positive electrode collector is mainly made from aluminum. The binder includes PVDF (Poly Vinylidene Fluoride) or SBR (Styrene Butadiene Rubber), and the solvent includes acetone or NMP (N-Methyl Pyrrolidone). It is also possible to use water as the solvent.

The electrode assembly includes a positive electrode plate, a separator, and a negative electrode plate, which are strips sequentially stacked and rolled in the form of a jelly roll, or spiral.

A slit die is formed on at least one surface of the electrode collector forming the positive electrode plate or the negative electrode plate. Slurry is fed into the slit die formed on the surface of the electrode collector, so that an electrode coating portion is formed on the surface of the electrode collector.

The slurry fed into the slit die of the electrode collector is a fluid including a solvent and a binder. The solvent is volatilized through a dry process so that the slurry is bonded to the electrode collector with sufficient bonding strength by means of the binder.

The electrode active material is coated on the electrode collector corresponding to a length of an electrode while forming an uncoated portion between the electrode coating portions in order to allow an electrode tab to be welded to the uncoated portion. Accordingly, the electrode collector includes the electrode coating portions and the uncoated portion.

However, although it may vary depending on slurry coating apparatuses, the slurry may be conglomerated on a coating start portion and a coating end portion of the electrode collector, so the coating start portion and the coating end portion of the electrode collector may slightly protrude as compared with other coating portions. Such protruding portions are formed at both ends of the electrode coating portions of the positive electrode plate and the negative electrode plate.

For this reason, pressure is concentrated on the protruding sections when winding the electrode assembly or external impact is applied to the electrode assembly, so the separator used for insulating the positive electrode plate from the negative electrode plate may be damaged. If a short circuit is generated between the positive electrode plate and the negative electrode plate due to the damage of the separator, not only is a yield rate of the secondary batteries reduced, but also an accident may occur.

In order to solve the above problems, an insulation layer is conventionally formed on the protruding sections of the electrode coating portions coated on at least one surface of the positive electrode plate or the negative electrode plate, thereby preventing the positive electrode plate from making contact with the negative electrode plate and preventing the separator from being damaged due to the protruding sections.

However, in this case, the insulation layer may cover a part of the electrode coating portion, so the reaction area of the electrode coating portion is reduced. Accordingly, capacity of the secondary battery is reduced proportionally to the reduction of the reaction area of the electrode coating portion.

That is, since the capacity of the secondary battery is proportional to the reaction area of the electrode coating portion of the positive electrode and the negative electrode, if the reaction area of the electrode coating portion is reduced due to the insulation layer, the capacity of the secondary battery is also reduced.

SUMMARY OF THE INVENTION

Accordingly, embodiments of the present invention may solve one or more of the above-mentioned problems occurring in the prior art, and are directed to providing a secondary battery capable of preventing battery capacity from being reduced while forming an insulation layer on protrusions formed on both ends of an electrode coating portion of an electrode assembly in order to prevent a short circuit between electrode plates.

In one embodiment, a secondary battery has a first electrode plate including a first electrode collector, the electrode collector having at least one surface on which a first electrode active material is coated to form a first electrode coating portion. A first electrode uncoated portion is formed on at least one end of the first electrode collector, and a first protrusion is formed on an end of the first electrode coating portion. A second electrode plate includes a second electrode collector, the second electrode having at least one surface on which a second electrode active material is coated to form a second electrode coating portion. A second electrode uncoated portion is formed on at least one end of the second electrode collector, and a second protrusion is formed on an end of the second electrode coating portion. A separator is interposed between the first and second electrode plates to insulate the first electrode plate from the second electrode plate. At least one insulation member is formed on and covers the first protrusion, the second protrusion, or both, such that an electrolyte is flowable through the at least one insulation member.

According to an exemplary embodiment of the present invention, the at least one insulation member is formed on an entire surface of the first electrode plate, the second electrode plate, or both. In one embodiment, the at least one insulation member is formed on two ends of the first electrode coating portion, the second electrode coating portion, or both. The insulation member may have a width in a range of about 10 to 20 mm.

The at least one insulation member, in one embodiment, includes a base substrate and an adhesive layer coated on at least one surface of the base substrate. The base substrate is made from a porous material having a heat-deflection temperature above 150° C. and a porosity above 1%. The base substrate is made from one material selected from the group consisting of porous polyethylene (PE), porous polyphenylene (PP), porous polyurethane, porous silicon dioxide, polyphenylene sulfide, and polyphenylacetylene.

The base substrate includes a heat-activated tape, which is made from PE or PP. The heat-activated tape can be a non-adhesive heat-activated tape, on which an adhesive layer is not formed.

The base substrate may have a thickness of less than 20 μm.

The adhesive layer may include an adhesive material, which does not react with the electrolyte. The adhesive layer includes a hot melt material, which is one selected from the group consisting of a rubber-based hot melt material, a silicon-based hot melt material, and an acrylic-based hot melt material.

The adhesive layer may be coated on the base substrate in a pattern having openings at a predetermined interval from each other. The adhesive layer may be coated on the base substrate in a stripe pattern or a lattice pattern, and may have a thickness of less than 10 μm.

The at least one insulation member may also have a mesh structure or be formed with a plurality of perforation holes. An area of the perforation holes may be within a range of about 30 to 90% with respect to a total area of the insulation member bonded to a surface of the first electrode coating portion, the second electrode coating portion, or both. At least five perforation holes may be formed in the insulation member bonded to the surface of the first electrode coating portion, the second electrode coating portion, or both.

The adhesive layer may have a thickness of less than 50 μm.

In another embodiment, an electrode plate includes an electrode collector, the electrode collector having at least one surface on which an electrode active material is coated to form an electrode coating portion. An electrode uncoated portion is formed on at least one end of the electrode collector, and a protrusion is formed on an end of the electrode coating portion. An insulation member is formed on and covers the protrusion, such that an electrolyte is flowable through the insulation member.

BRIEF DESCRIPTION OF THE DRAWINGS

The above and other features and aspects of the claimed invention will be more apparent from the following detailed description taken in conjunction with the accompanying drawings.

DETAILED DESCRIPTION

Figure 1:
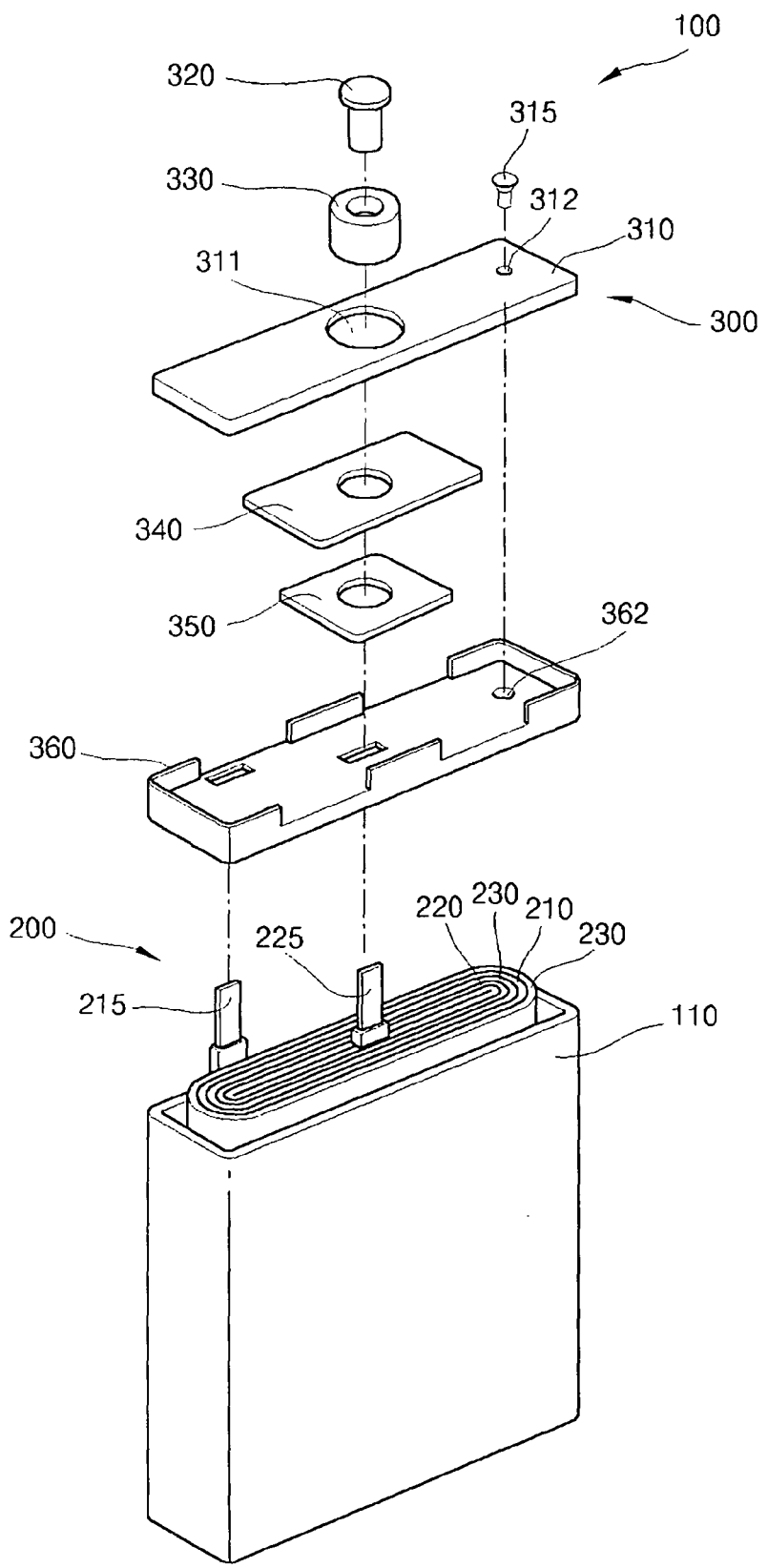
FIG. 1 is an exploded perspective view of a secondary battery according to one embodiment of the present invention.

Hereinafter, examples of embodiments of the present invention will be described with reference to the accompanying drawings. In the following description and drawings, the same reference numerals are used to designate the same or similar components, so repetition of the description on the same or similar components will be omitted.

Referring to FIGS. 1 to 7, the secondary battery 100 of the present invention includes a case 110, a jelly roll type electrode assembly 200 within the case 110, and a cap assembly 300 coupled to an upper portion of the case 110.

The case 110 is made from a metallic member having a rectangular box shape, one side of which is opened. The case 110 may act as a terminal.

The electrode assembly 200 includes a first electrode plate 210 provided with a first electrode tap 215, a second electrode plate 220 provided with a second electrode tap 225, and a separator 230 interposed between the first and second electrode plates 210 and 220. The first and second electrode plates 210 and 220 and the separator 230 are rolled in the form of a jelly roll, thereby forming the electrode assembly 200.

The cap assembly 300 has a planar cap plate 310 having a size and a shape corresponding to those of an opening section of the case 110. The cap plate 310 is formed at a center portion thereof with a terminal hole 311 and an electrolyte injection hole 312 is formed at one side of the cap plate 310 in order to inject an electrolyte into the case 110. A plug 315 is inserted into the electrolyte injection hole 312, thereby sealing the electrolyte injection hole 312.

An electrode terminal 320 (for example, a negative electrode terminal) is inserted into the terminal hole 311. A gasket 330 having a tube shape is installed around the electrode terminal 320 in order to electrically insulate the electrode terminal 320 from the cap plate 310.

An insulation plate 340 is disposed below the cap plate 310 and a terminal plate 350 is disposed below the insulation plate 340.

The first electrode tap 215 extending from the first electrode plate 210 is welded to a lower portion of the cap plate 310 and the second electrode tap 225 extending from the second electrode plate 220 is welded to a lower portion of the electrode plate 320.

An insulation case 360 is installed at an upper surface of the electrode assembly 200 in order to electrically insulate the electrode assembly 200 from the cap assembly 300 while covering an upper end portion of the electrode assembly 200. The insulation case 360 has an electrolyte hole 362 positioned corresponding to the electrolyte injection hole 312 of the cap plate 310 in such a manner that the electrolyte can be injected into the case 110.

Figure 2:
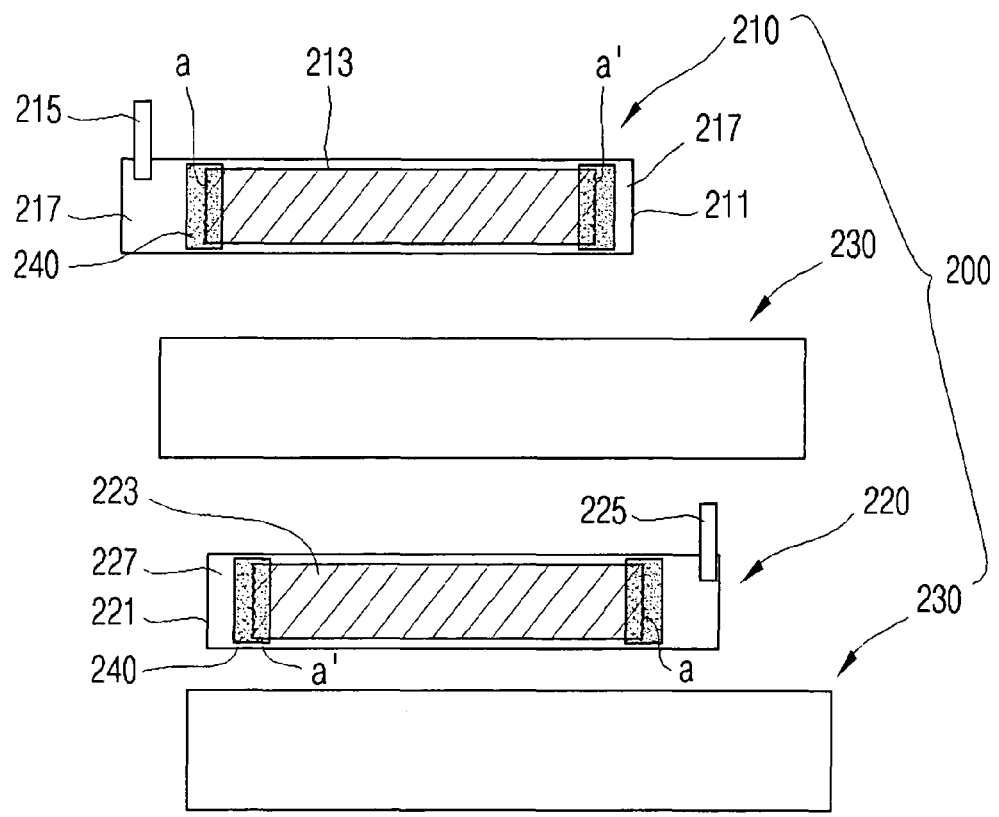
FIG. 2 is a plan view illustrating an unassembled electrode assembly according to one embodiment of the present invention.
Figure 3:
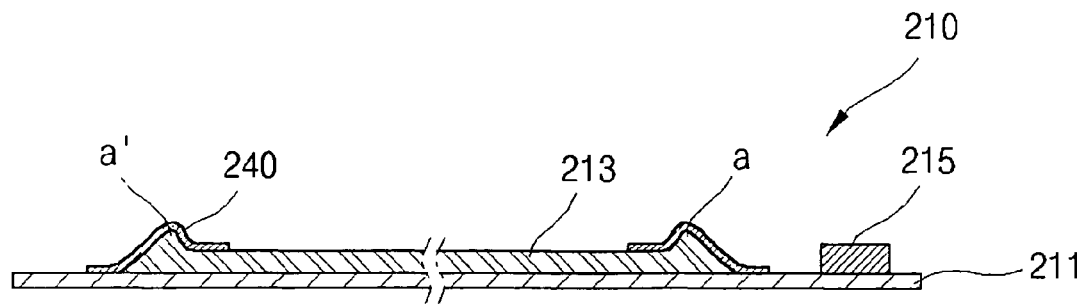
FIG. 3 is a sectional view illustrating an electrode collector of a secondary battery according to one embodiment of the present invention.
Figure 4:
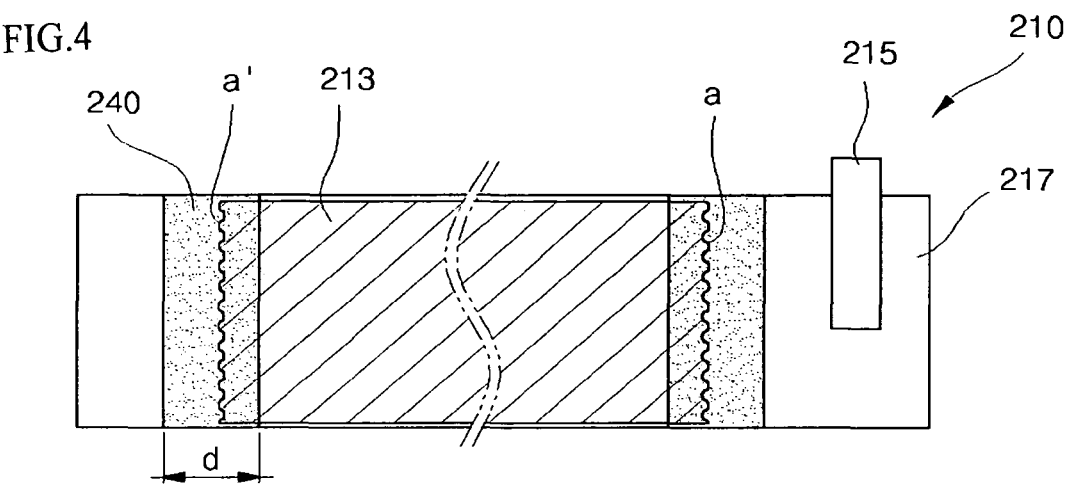
FIG. 4 is a plan view illustrating an electrode collector of a secondary battery according to one embodiment of the present invention.

FIG. 2 is a view illustrating the electrode assembly according to one embodiment of the present invention, and FIGS. 3 and 4 are sectional views illustrating an electrode collector of the secondary battery according to one embodiment of the present invention. Referring to FIGS. 2 to 4, the electrode assembly 200 includes the first electrode plate 210, the second electrode plate 220 and the separator 230, which are in the form of strips. At this time, the first and second electrode plates 210 and 220 may have a positive polarity or a negative polarity. In the following description, the first electrode plate 210 will be referred to as a positive electrode plate and the second electrode plate 220 will be referred to as a negative electrode plate.

The positive electrode plate 210 includes a positive electrode collector 211 made from a metallic thin film having superior conductivity, such as aluminum foil, and a positive electrode coating portion 213 coated on both surfaces of the positive electrode collector 211. Chalcogenide compounds, such as $LiCoO_2$, $LiMn_2O_4$, $LiNiO_2$, $LiNi_{1-x}Co_xO_2$ (0<x<1), or $LiMn_2O_2$, can be used as positive electrode active materials. However, the present invention is not limited as to the above positive electrode active materials.

Positive uncoated portions 217, in which the positive electrode coating portion 213 is not formed, is formed at both end portions of the positive electrode plate 210. A positive electrode tap 215 is electrically connected to one of the positive uncoated portions 217.

The negative electrode plate 220 includes a negative electrode collector 221 made from a metallic thin film having superior conductivity, such as copper foil or nickel foil, and a negative electrode coating portion 223 coated on both surfaces of the negative electrode collector 221. Carbon-based materials, Si, Sn, tin oxides, composite tin alloys, transition metal oxides, lithium metal nitrides or lithium metal oxides can be used as negative electrode active materials. However, the present invention is not limited as to the above negative electrode active materials.

A negative uncoated portion 227, in which the negative electrode coating portion 223 is not formed, is formed at both end portions of the negative electrode plate 220, respectively. A negative electrode tap 225 is electrically connected to one of the negative uncoated portions 227.

In addition, the positive and negative electrode plates 210 and 220 include insulation members 240, respectively. The insulation members 240 cover protrusions a, a' on end portions of the positive and negative electrode coating portions 213, 223.

That is, the insulation members 240 surround the protrusions a, a' which are formed on uneven parts of the end portions of the positive and negative electrode coating portions 213 and 223 provided on one surface of the positive and negative electrode collectors 211 and 221 of the positive and negative electrode plates 210 and 220. In one embodiment, the insulation members 240 cover entire surfaces of the positive and negative electrode plates 210 and 220 or at least one of both ends of the protrusions a, a' of the positive and negative electrode coating portions 213 and 223.

In one embodiment, the insulation member 240 has a width (d) of about 15 mm. If the insulation member 240 has a width (d) exceeding a range of between 10 to 20 mm, the movement of the electrolyte may be interrupted. In addition, if the insulation member 240 has a width (d) below a range of between 10 to 20 mm, the insulation members 240 may be separated from the positive and negative electrode collectors 211 and 221 due to external force applied thereto by the electrolyte being moved.

Figure 5A:
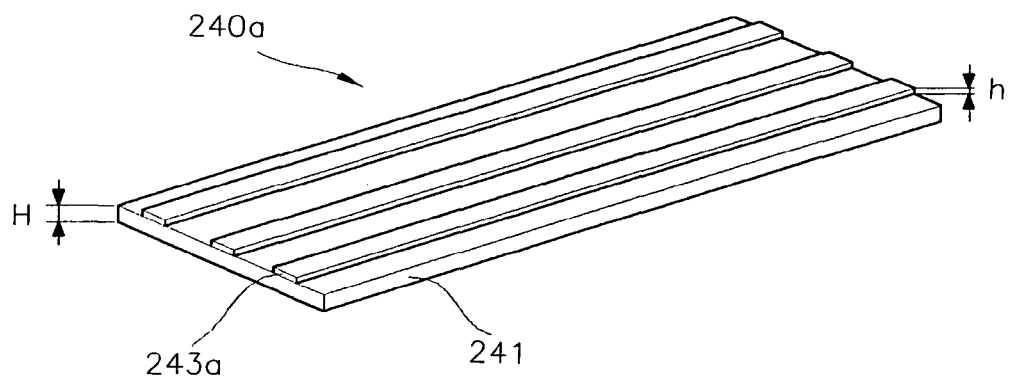
FIG. 5a is a perspective view illustrating one embodiment of an insulation member according to the present invention.

As shown in FIG. 5a, the insulation member 240a includes a base substrate 241 and an adhesive layer 243a coated on at least one surface of the base substrate 241. The internal temperature of the base substrate 241 may rise up to about 150° C. if the secondary battery is overcharged. Accordingly, in one embodiment, the base substrate 241 is formed by using materials having a heat-deflection temperature above 150° C.

The base substrate 241 may be made from a porous material in such a manner that the electrolyte can pass through the base substrate 241.

The porous material has a porosity above 1% for allowing the electrolyte to easily pass through the porous material. In one embodiment, the porous material is one selected from the group consisting of polyphenylene sulfide (PPS), porous polyphenylene (PP), porous polyethylene (PE), porous polyurethane, porous silicon dioxide, and polyphenylacetylene (PPA). However, the present invention is not limited as to the above porous materials.

A heat-activated tape made from PP or PE can be used for the base substrate 241. In addition, the heat-activated tape may be a non-adhesive heat-activated tape, in which an adhesive layer is not formed. The heat-activated tape can be laminated on the positive and negative electrode plates 210 and 220 (FIGS. 1-5a) even if weak heat is applied thereto. In one embodiment, the base substrate 241 has a thickness (H) less than 20 μm in order to minimize a thickness of the insulation member 240a.

The adhesive layer 243a includes an adhesive material, which does not react with the electrolyte. The adhesive material includes a hot melt material extracted from a glue gun. The hot melt material is one selected from the group consisting of a rubber-based hot melt material, a silicon-based hot melt material, and an acrylic-based hot melt material. However, the present invention is not limited as to the above hot melt materials.

Since the hot melt material is extracted from the glue gun, it is easy to align the adhesive layer 243a on the base substrate 241. In addition, the hot melt material, such as 100% thermoplastic resin, is coated on the base substrate 241 in a liquid phase under a high temperature and is solidified within a short period of time, so that the hot melt material is securely bonded to the base substrate 241.

Figure 5B:
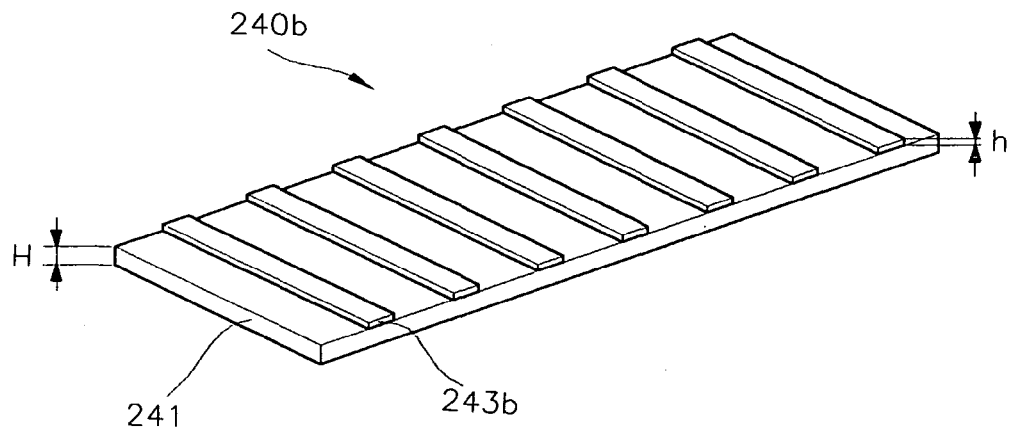
FIG. 5b is a perspective view illustrating another embodiment of an insulation member according to the present invention.
Figure 5C:
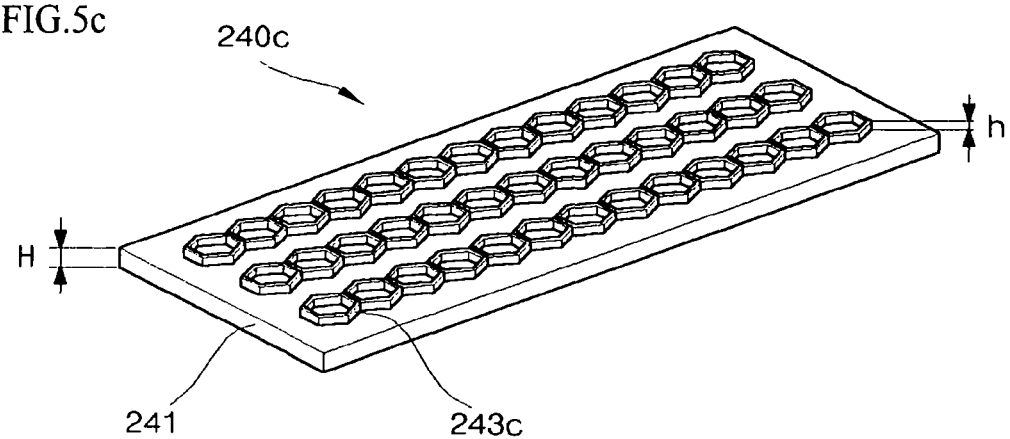
FIG. 5c is a perspective view illustrating yet another embodiment of an insulation member according to the present invention.

As shown in FIGS. 5a to 5c, the adhesive layers 243a-243c of the insulation members 240a-240c are coated on the base substrates 241 while forming predetermined paths therebetween in order to allow the electrolyte to flow through the paths. The adhesive layers may be formed on the base substrate 241 in a stripe pattern. That is, the adhesive layers can be formed lengthwise along the base substrate 241 (see, 243a in FIG. 5a) or widthwise along the base substrate (see, 243b in FIG. 5b). In addition, the adhesive layers can be formed in a lattice pattern (see, 243c in FIG. 5c). Although a hexahedral lattice pattern is shown in FIG. 5c, the present invention is not limited thereto.

In one embodiment, a minimum amount of adhesive material is coated on the base substrate 241 such that a thickness (h) of the adhesive layer is less than 10 μm in order to minimize a volume of the electrode assembly.

Figure 6:
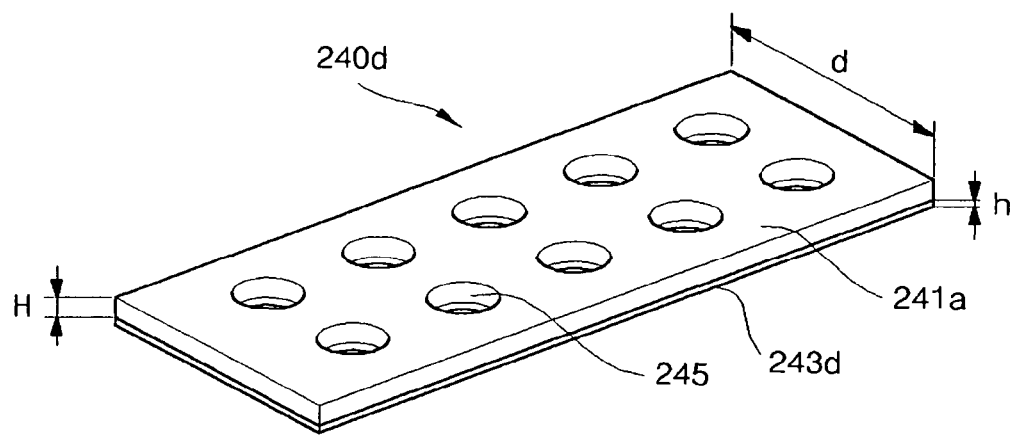
FIG. 6 is a perspective view illustrating an insulation member according to another embodiment of the present invention.
Figure 7:
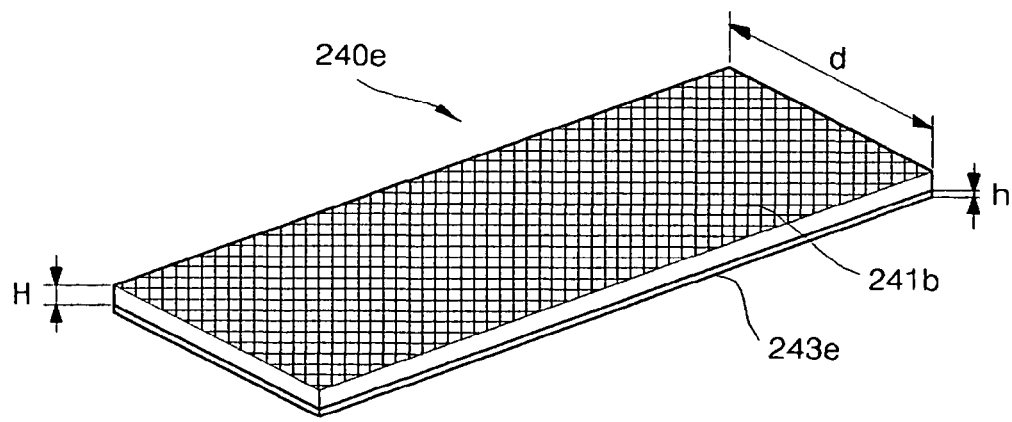
FIG. 7 is a perspective view illustrating an insulation member according to another embodiment of the present invention.

The insulation member 240d shown in FIG. 6 has a plurality of perforation holes 245 formed in the base substrate 241a in order to allow the electrolyte to pass through the base substrate 241a. In addition, it is also possible to fabricate the base substrate 241b of the insulation layer 240e with a mesh structure (see, FIG. 7). In these cases, the electrolyte can easily pass through the insulation member 240e even if the insulation member 240e is made from an ion non-permeable material.

Although FIG. 6 illustrates that the perforation holes 245 are spaced at a predetermined interval from each other, the present invention does not limit the alignment of the perforation holes 245. For instance, the perforation holes 245 can be aligned while being offset from each other. In one embodiment, at least five perforation holes 245 are formed in the base substrate 241d in such a manner that an area of the perforation holes 245 is within a range of about 30 to 90% with respect to a total area of the base substrate 241a bonded to upper surfaces of the positive and negative electrode coating portions 213 and 223 (FIGS. 1-4, 6).

In this embodiment, the insulation member 240d has a thickness less than 50 μm in order to minimize a volume of the electrode assembly 200.

As mentioned above, according to embodiments described above, the insulation member used for covering the protrusions of the secondary battery is made from a porous material. In addition, the size of the insulation member and distribution of the adhesive layers are minimized in such a manner that the volume of the electrode assembly can be minimized while facilitating the movement of the electrolyte. Accordingly, the short circuit between the electrodes can be prevented, thereby preventing the separator from being damaged.

Although examples of embodiments of the present invention have been described for illustrative purposes, those skilled in the art will appreciate that various modifications, additions and substitutions are possible, without departing from the scope and spirit of the invention as disclosed in the accompanying claims and equivalents thereof.

What is claimed is:

1. A secondary battery comprising:
a first electrode plate including a first electrode collector, the first electrode collector having a first electrode coating portion coated with a first electrode active material, a first electrode uncoated portion on at least one end of the first electrode collector, and a first protrusion on at least one end of the first electrode coating portion;
a second electrode plate including a second electrode collector, the second electrode collector having a second electrode coating portion coated with a second electrode active material, a second electrode uncoated portion on a least one end of the second electrode collector, and a second protrusion on a least one end of the second electrode coating portion;
a separator between the first electrode plate and the second electrode plate for insulating the first electrode plate from the second electrode plate; and
at least one insulation member on and covering the first protrusion, the second protrusion, or both the first protrusion and the second protrusion,
wherein the at least one insulation member includes a base substrate such that an electrolyte is capable of flowing through the base substrate and an adhesive layer coated on at least one surface of the base substrate in a pattern having openings spaced from each other by an interval, and
wherein the base substrate has a porosity above 1%.

2. The secondary battery as claimed in claim 1, wherein the at least one insulation member is formed on an entire surface of the first electrode plate, the second electrode plate, or both.

3. The secondary battery as claimed in claim 1, wherein the at least one insulation member is on both ends of the first electrode coating portion, both ends of the second electrode coating portion, or the ends of both the first electrode coating portion and the second electrode coating portion.

4. The secondary battery as claimed in claim 1, wherein the at least one insulation member has a width in a range of about 10 to 20 mm.

5. The secondary battery as claimed in claim 1, wherein the base substrate is made from a material selected from the group consisting of porous polyethylene, porous polyphenylene, porous polyurethane, porous silicon dioxide, and polyphenylacetylene.

6. The secondary battery as claimed in claim 1, wherein the base substrate includes a heat-activated tape, which is bonded to the first electrode plate, the second electrode plate, or both the first electrode plate and the second electrode plate.

7. The secondary battery as claimed in claim 6, wherein the heat-activated tape is made from polyphenylene or polyethylene.

8. The secondary battery as claimed in claim 6, wherein the heat-activated tape is a non-adhesive heat-activated tape, on which an adhesive layer is not formed.

9. The secondary battery as claimed in claim 1, wherein the base substrate has a thickness less than about 20 μm.

10. The secondary battery as claimed in claim 1, wherein the adhesive layer includes an adhesive material, which does not react with the electrolyte.

11. The secondary battery as claimed in claim 10, wherein the adhesive layer includes a hot melt material.

12. The secondary battery as claimed in claim 11, wherein the hot melt material is one selected from the group consisting of a rubber-based hot melt material, a silicon-based hot melt material, and an acrylic-based hot melt material.

13. The secondary battery as claimed in claim 1, wherein the adhesive layer is coated on the base substrate in a stripe pattern.

14. The secondary battery as claimed in claim 1, wherein the adhesive layer is coated on the base substrate in a lattice pattern.

15. The secondary battery as claimed in claim 1, wherein the adhesive layer has a thickness of less than about 10 μm.

16. The secondary battery as claimed in claim 1, wherein the at least one insulation member has a thickness of less than about 50 μm.

17. The secondary battery as claimed in claim 1, wherein the at least one insulation member has a plurality of perforation holes.

18. The secondary battery as claimed in claim 17, wherein an area taken up by the perforation holes is between about 30 and about 90% of a total area of the at least one insulation member bonded to a surface of the first electrode coating portion, the second electrode coating portion, or both the first electrode coating portion and the second electrode coating portion.

19. The secondary battery as claimed in claim 18, wherein at least five perforation holes are formed in the at least one insulation member bonded to the surface of the first electrode coating portion, the second electrode coating portion, or both the first electrode coating portion and the second electrode coating portion.

20. The secondary battery as claimed in claim 18, wherein the at least one insulation member has a mesh structure.

21. The secondary battery as claimed in claim 1, wherein the first electrode plate is a negative electrode plate.

22. An electrode plate comprising:
   an electrode collector having an electrode coating portion coated with an electrode active material;
   an electrode uncoated portion on at least one end of the electrode collector;
   a protrusion on an end of the electrode coating portion;
   a separator; and
   an insulation member on and covering the protrusion,
   wherein the insulation member includes a base substrate and an adhesive layer coated on at least one surface of the base substrate in a pattern having openings spaced from each other by an interval and is adapted such that an electrolyte is capable of flowing through the base substrate, and
   wherein the base substrate has a porosity above 1%.

* * * * *

UNITED STATES PATENT AND TRADEMARK OFFICE
CERTIFICATE OF CORRECTION

PATENT NO.        : 7,951,492 B2                                      Page 1 of 1
APPLICATION NO.   : 11/261411
DATED             : May 31, 2011
INVENTOR(S)       : Jung Ho Kim et al.

It is certified that error appears in the above-identified patent and that said Letters Patent is hereby corrected as shown below:

In the Claims

Column 8, Claim 1, line 7.          Delete "a"

Insert -- at --

Column 8, Claim 1, line 8.          Delete "a"

Insert -- at --

Column 8, Claim 1, line 13.         Delete "on"

Insert -- separated from the separator --

Signed and Sealed this
Twenty-fifth Day of September, 2012

David J. Kappos
*Director of the United States Patent and Trademark Office*